(12) United States Patent
Ishikawa et al.

(10) Patent No.: US 7,826,392 B2
(45) Date of Patent: Nov. 2, 2010

(54) ADVERTISEMENT SEARCH AGENT

(75) Inventors: Yuichi Ishikawa, Tokyo (JP); Akira Tsukamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 587 days.

(21) Appl. No.: 11/705,105

(22) Filed: Feb. 12, 2007

(65) Prior Publication Data

US 2007/0206596 A1 Sep. 6, 2007

(30) Foreign Application Priority Data

Mar. 3, 2006 (JP) .............................. 2006-057665

(51) Int. Cl.
*H04L 12/28* (2006.01)
*G06F 15/16* (2006.01)

(52) U.S. Cl. ..................... 370/254; 370/390; 709/204

(58) Field of Classification Search .................. None
See application file for complete search history.

(56) References Cited

U.S. PATENT DOCUMENTS

2004/0133640 A1* 7/2004 Yeager et al. ............... 709/204

2005/0114482 A1 5/2005 Ko
2005/0185658 A1 8/2005 Kamiwada et al.
2006/0187858 A1* 8/2006 Kenichi et al. ............. 370/254

FOREIGN PATENT DOCUMENTS

| JP | 2005-123686 A | 5/2005 |
| JP | 2005-136718 A | 5/2005 |
| JP | 2005-158017 A | 6/2005 |
| JP | 2005-244408 A | 9/2005 |
| JP | 2005-311733 A | 11/2005 |

* cited by examiner

*Primary Examiner*—Steven H Nguyen
(74) *Attorney, Agent, or Firm*—Foley & Lardner LLP

(57) ABSTRACT

An advertisement search agent detects a service that is provided by a node or a service that can be used by a node immediately after the node is newly connected to a domain. A message acquisition unit acquires an advertisement search message broadcast or multicast by a node connected to either one of a plurality of domains. A message database stores advertisement search messages acquired by the message acquisition unit. A node connection monitoring unit detects the connection of a node to either one of a plurality of domains. When the connection of a node is detected by the node connection monitoring unit, a delivery message extractor extracts an advertisement search message stored in the message database. A message delivery unit delivers the advertisement search message extracted by the delivery message extractor.

17 Claims, 10 Drawing Sheets

Fig. 4

| No. | SOURCE MAC ADDRESS | MESSAGE |
|---|---|---|
| 1 | A | SSDP Discover |
| 2 | B | SSDP Alive |
| 3 | B | SSDP ByeBye |
| 4 | C | SSDP Discover |
| 5 | D | SSDP Alive |
| 6 | D | SSDP ByeBye |
| 7 | E | SSDP Discover |
| 8 | G | SSDP Discover |
| 9 | H | SSDP Alive |
| 10 | H | SSDP ByeBye |
| 11 | I | SSDP Discover |
| 12 | J | SSDP Alive |
| 13 | J | SSDP ByeBye |

ADVERTISEMENT SEARCH AGENT

BACKGROUND OF THE INVENTION

1. Field of the Invention

The present invention relates to an advertisement search agent, and more particularly to an advertisement search agent for detecting a change in available services on a network due to a connection or a disconnection of a node.

2. Description of the Related Art

Heretofore, broadcast and multicast technologies have been used as means for discovering services provided on networks. Nodes which provide services (hereinafter referred to as service providing nodes) on a network advertise the existence of services using broadcast or multicast to simultaneously inform nodes using all services that exist oh the same network (hereinafter referred to as service using nodes) of the existence of the services. The service using nodes can simultaneously recognize all the services that exist on the network by searching for the existence of the services using broadcast or multicast. Applications for discovering services based on broadcast or multicast include UPnP DA (Universal Plug and Play Device Architecture) and messenger software known as IP Messenger, which are widely used in the art.

Since the broadcast and multicast techniques pose a large load on networks, the above applications are implemented to restrict the frequency of broadcast and multicast services. Specifically, it is the general practice for a service providing node or a service using node to broadcast or multicast a message for advertising or searching for the service when the node machine is activated, i.e., when the application is activated, and thereafter to provide a broadcast or multicast service automatically at certain time intervals. Though the time intervals for providing the broadcast or multicast service differ depending on how individual applications are implemented, they are generally 30 minutes each for UPnP DA, for example.

If a service providing node or a service using node is newly connected to a network after the node machine is activated or when a service providing node or a service using node is connected to a network that is different from the network to which the service providing node or the service using node was connected when the node machine was activated, then the node is unable to discover service providing nodes already connected to the network or advertise its own service to service using nodes immediately after the node is connected to the network. For example, when service using node A is connected to a network to which service providing nodes X, Y have already been connected, service using node A has to wait until service providing nodes X, Y broadcast or multicast their advertisement messages or service using node A broadcasts or multicasts its search message, in order to recognize the existence of service providing nodes X, Y on the network. The same problem arises when a service providing node is connected to a network and also when a node is disconnected from a network.

The problem also occurs not only when a node is connected to a physical network, but also when a node is connected to a virtual network. Advertising or searching for services on a network using broadcast or multicast is limited to the network only. Recently, attention has been drawn to the use on a virtual network of applications for advertising or searching for services using broadcast or multicast. The reason for using those applications on the virtual network is that a virtual network created across physically different networks for advertising or searching for services on the virtual network using broadcast or multicast allows the user to discover services that are present on physically different networks. While the virtual network is advantageous as described above, it also suffers the problem described above, i.e., a service providing node or a service using node, immediately after it is newly connected to a virtual network, is unable to use services on the virtual network or provide services to nodes on the virtual network.

One solution to the above problem is a method of installing a device proxy for advertising a service on behalf of a service providing node as disclosed in JP2005-311773A.

The device proxy is provided in each subnet. Device proxies that are present in different subnets are linked to inform service using nodes that are present in different subjects of the existence of a service immediately when required. Specifically, the following procedure is carried out:

When a device proxy receives a connection request from another device proxy, the device proxy broadcasts a search message to the subject to which it is connected, for searching for a service providing node. When the device proxy receives a response frame in response to the search message, the device proxy converts the response frame into an advertisement frame, and delivers the advertisement frame to the device proxy which has sent the connection request. In this manner, a service using node can discover a service provided on the network immediately after the connection request.

The above conventional technology, however, suffers the following three drawbacks:

The first drawback is that when a service providing node is connected to a network, it cannot immediately inform service using nodes already connected to the network of the information of services that are newly connected to the network. Heretofore, when a service using node is connected to a network, a service providing node that has already been connected to the network informs the service using node of the existence of services provided by the service providing node, and when a service providing node is connected to the network, the service providing node does not advertise services provided by the service providing node to existing service using nodes.

The second drawback is that since a device proxy informs a newly connected node of the information of all services that exist in a subnet domain to which the device proxy is connected, the device proxy is unable to selectively advertise the existence of a service among the services that exist in the subnet domain to which the device proxy is connected. For example, a device proxy is connected to physical subnet A and virtual subnet B, and of services X, Y, Z connected to subnet A, only service X is connected to virtual subnet B. Heretofore, node I newly connected to virtual subnet B is informed of not only service X that is connected to virtual subnet B, but also services Y, Z. As a result, node I is informed of the services that are actually not available to node I, and, even if services Y, Z are deliberately not connected to the virtual network to reject use by node I, the information of services Y, Z leaks to node I. This problem arises when the device proxy is connected to a plurality of physical networks and also when the device proxy is connected to a plurality of virtual networks.

The third drawback is that the disconnection of a node from a network cannot immediately be indicated because a conventional device proxy does not have a function to indicate the disconnection of a node from a network. For example, when a service providing node is disconnected from a network, a service using node connected to the network is unable to detect the unavailability of the service provided by the service providing node immediately after the service providing node is disconnected. Furthermore, when a service using node is disconnected from a network, the service using node is unable to detect the unavailability of the services provided by the network immediately after the service using node is disconnected.

SUMMARY OF THE INVENTION

It is an object of the present invention to provide an advertisement search agent which is capable of detecting a service that can be provided by or used by a node that is newly connected to a domain connected to nodes, immediately after the node is connected to the domain.

According to the present invention, an advertisement search message broadcast or multicast by a node connected to either one of a plurality of domains is acquired by a message acquisition unit. The acquired advertisement search message is stored in a message database. When the connection of a node is detected by a node connection monitoring unit, a delivery message extractor extracts only a search message and a service availability advertisement message delivered from the connected node, of advertisement search messages stored in the message database, or recognizes a node connected to a domain, and extracts only a search message and a service availability advertisement message delivered from the node connected to the domain. If only the search message and the service availability advertisement message delivered from the connected node are extracted, then a message delivery unit delivers the search message and the service availability advertisement message which are extracted to the domain to which the node is connected. If only the search message and the service availability advertisement message delivered from the node connected to the domain, then the message delivery unit delivers the search message and the service availability advertisement message which are extracted to the node connected to the domain.

With the above arrangement, if a node newly connected to a domain is a service providing node for providing a service to the domain, then the node can detect the service at the domain immediately after the node is connected, and if a node newly connected to a domain is a service using node for using a service, then the node can detect the service available at the domain immediately after the node is connected.

The above and other objects, features, and advantages of the present invention will become apparent from the following description with reference to the accompanying drawings which illustrate an example of the present invention.

BRIEF DESCRIPTION OF THE DRAWINGS

FIG. 4 is a diagram showing details of data stored in a message database (DB) of the advertisement search agent module shown in FIG. 1 which is located in the position shown in FIG. 3;

DETAILED DESCRIPTION OF THE PREFERRED EMBODIMENTS

1st Embodiment

Figure 1:
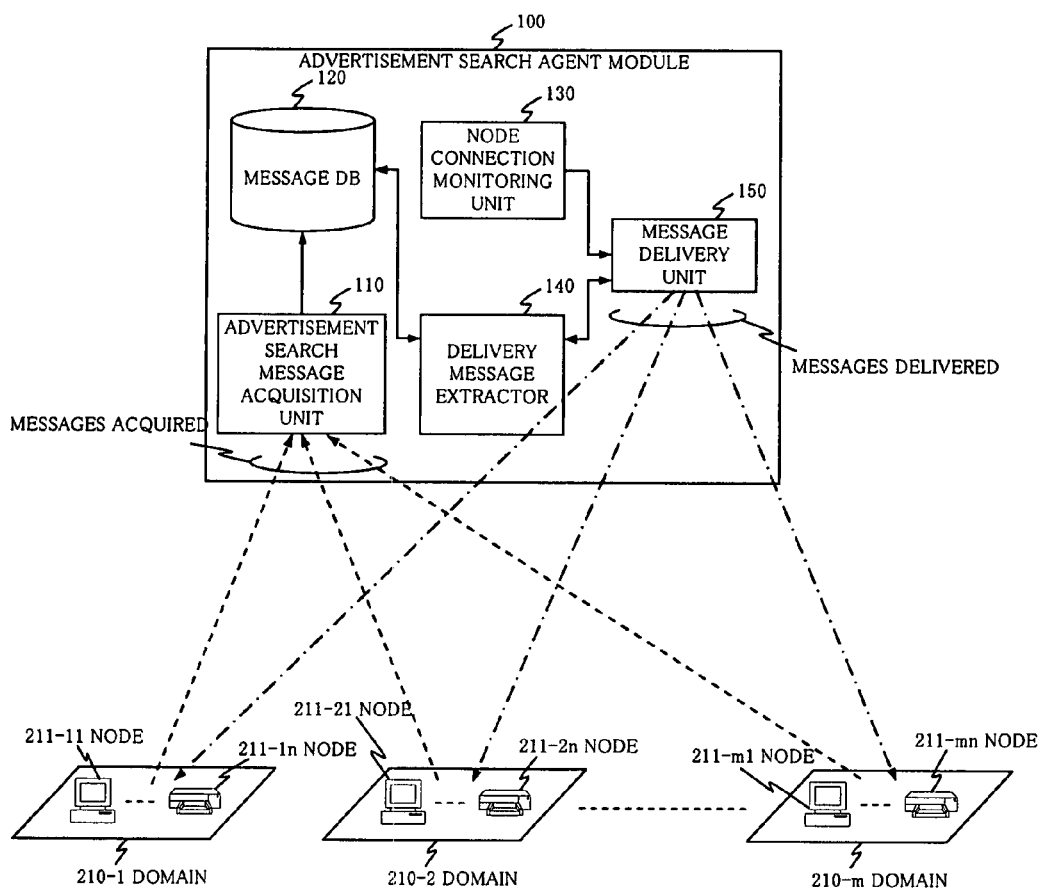
FIG. 1 is a block diagram of an advertisement search agent module according to a first embodiment of the present invention.

FIG. 1 shows advertisement search agent module 100 according to a first embodiment of the present invention, which is connected to a plurality of domains 210-1 through 210-*m*.

Domains 210-1 through 210-*m* are networks which provide broadcast or multicast domains that are independent of each other. A broadcast or multicast message delivered from a domain does not reach another domain. Examples of domains include a physical subnet (LAN), a virtual LAN (a VPN in layer 2 level) constructed by VLAN, Softether, or the like, a corporate intranet, an application-level virtual network constructed by a P2P file sharing application or the like such as Gnutella or the like.

Nodes 211-11 through 211-*mn* are nodes connected respectively to domains 210-1 through 210-*m* and running an application for advertising and searching for services using broadcast or multicast techniques. The application run on nodes 211-11 through 211-*mn* may be UPnP DA, IP Messenger, Gnutella, or the like, for example. Each of nodes 211-11 through 211-*mn* may be connected to a plurality of domains 210-1 through 210-*m*.

Nodes 211-11 through 211-*mn* are classified into one or both of service providing nodes which provide services and service using nodes which use services. For example, according to UPnP AV Architecture which provides subordinate regulations of UPnP DA, a node having a Control Point function serves as a service providing node, and a node having a Nedia Server function as a service using node. In some applications, a node both provides and uses services.

Nodes 211-11 through 211-*mn* may be not only ordinary PC terminals, but also terminals other than PCs such as DVD recorders, printers, home routers, etc. insofar as they run an application for advertising and searching for services using broadcast or multicast techniques. For example, television sets, DVD recorders, and small-size stereo systems may be used as nodes 211-11 through 211-*mn* operable under UPnP AV Architecture.

Services are advertised when service providing nodes broadcast or multicast a message for advertising a service availability status through connected domains 210-1 through 210-*m*. A message for advertising the availability of a service will hereinafter be referred to as a service availability advertisement message, and a message for advertising the unavailability of a service as a service unavailability advertisement message. For example, the service availability advertisement message and the service unavailability advertisement message correspond to an alive message and a byebye message prescribed by SSDP (Simple Service Discovery Protocol) for searching for and advertising services according to UPnP DA.

Services are searched for when service using nodes broadcast or multicast a search message through connected domains 210-1 through 210-*m*. For example, the search message corresponds to a Discover message prescribed by SSDP for UPnP DA.

The service availability advertisement message, the service unavailability advertisement message, and the search message will hereinafter collectively be referred to as an advertisement search message.

Advertisement search agent module 100 acquires advertisement search messages delivered from nodes 211-11 through 211-*mn* of domains 210-1 through 210-*m*. When nodes 211-11 through 211-*mn* are newly connected to any of domains 210-1 through 210-*m*, advertisement search agent module 100 delivers the acquired messages to domains 210-1 through 210-*m* to which the nodes are connected, so that nodes 211-11 through 211-*mn* can detect the services provided at connected domains 210-1 through 210-*m* immediately after nodes 211-11 through 211-*mn* are connected. Specifically, advertisement search agent module 100 delivers the acquired messages to domains 210-1 through 210-*m* to which the nodes are connected, so that the nodes already connected to domains 210-1 through 210-*m* can immediately detect the services provided by nodes 211-11 through 211-*mn*. When nodes 211-11 through 211-*mn* are disconnected from any of domains 210-1 through 210-*m*, advertisement search agent module 100 delivers the acquired messages to domains 210-1 through 210-*m* from which the nodes are disconnected, so that nodes 211-11 through 211-*mn* can detect the unavailability of the services provided at domains 210-1 through 210-*m* immediately after nodes 211-11 through 211-*mn* are disconnected. Specifically, advertisement search agent module 100 delivers the acquired messages to domains 210-1 through 210-*m* from which the nodes are disconnected, so that nodes 211-11 through 211-*mn* already connected to domains 210-1 through 210-*m* can detect the unavailability of the services provided by nodes 211-11 through 211-*mn* immediately after nodes 211-11 through 211-*mn* are disconnected.

Advertisement search agent module 100 acquires advertisement search messages delivered by nodes 211-11 through 211-*mn* in domains 210-1 through 210-*m*. When a node is newly connected to any of domains 210-1 through 210-*m*, if the newly connected node is a service using node, then advertisement search agent module 100 allows the newly connected node to discover the services provided by the domains to which the node is connected immediately after the node is connected. When a node is newly connected to any of domains 210-1 through 210-*m*, if the newly connected node is a service providing node, then advertisement search agent module 100 allows the service using nodes already connected to the domains to which the node is connected to discover the services provided by the newly connected node immediately after the node is connected. When a node is disconnected from any of domains 210-1 through 210-*m*, if the disconnected node is a service using node, then advertisement search agent module 100 allows the disconnected node to detect the unavailability of the services provided at the domains from which the node is disconnected immediately after the node is disconnected. When a node is disconnected from any of domains 210-1 through 210-*m*, if the disconnected node is a service providing node, then advertisement search agent module 100 allows the service using nodes already connected to the domains from which the node is disconnected to detect the unavailability of the services provided by the disconnected node immediately after the node is disconnected. To allow the node to discover available or unavailable services, advertisement search agent module 100 delivers the acquired advertisement search messages to the domains to which the node or nodes are connected.

Advertisement search agent module 100 is disposed in a position capable of receiving broadcast or multicast messages from domains 210-1 through 210-*m* and of delivering broadcast or multicast messages to domains 210-1 through 210-*m*. Domains 210-1 through 210-*m* to and from which advertisement search agent module 100 can receive and send broadcast or multicast messages will hereinafter be referred to as monitoring domains of advertisement search agent module 100.

Figure 2:
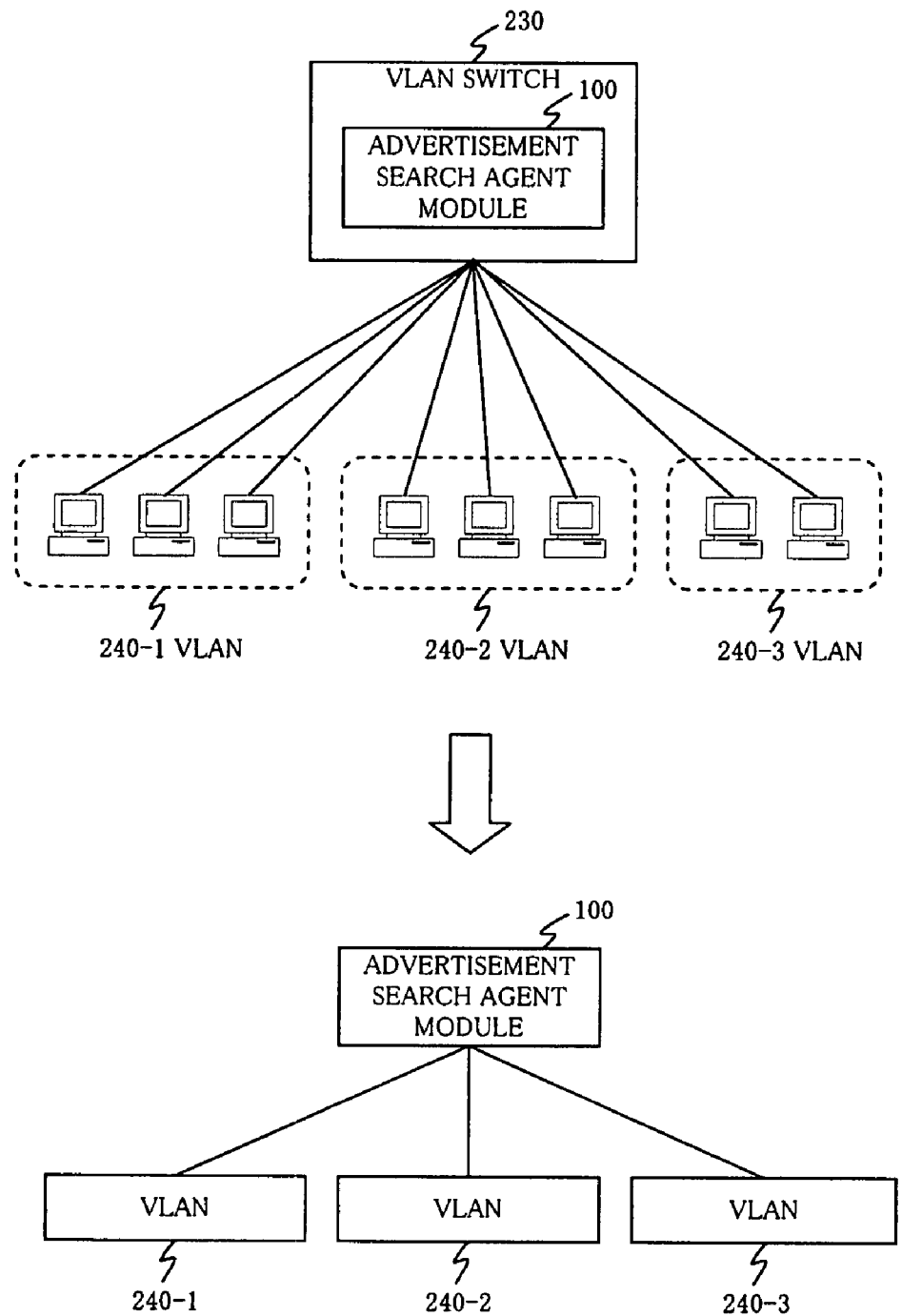
FIG. 2 is a diagram showing a connected configuration in which the advertisement search agent module shown in FIG. 1 is disposed in a VLAN switch.

As shown in FIG. 2, advertisement search agent module 100 shown in FIG. 1 is disposed in VLAN switch 230 which accommodates a plurality of VLANs 240-1 through 240-3. Advertisement search agent module 100 can send and receive broadcast and multicast messages to and from VLANs 240-1 through 240-3. In FIG. 2, VLANs 240-1 through 240-3 serve as monitoring domains of advertisement search agent module 100.

Figure 3:
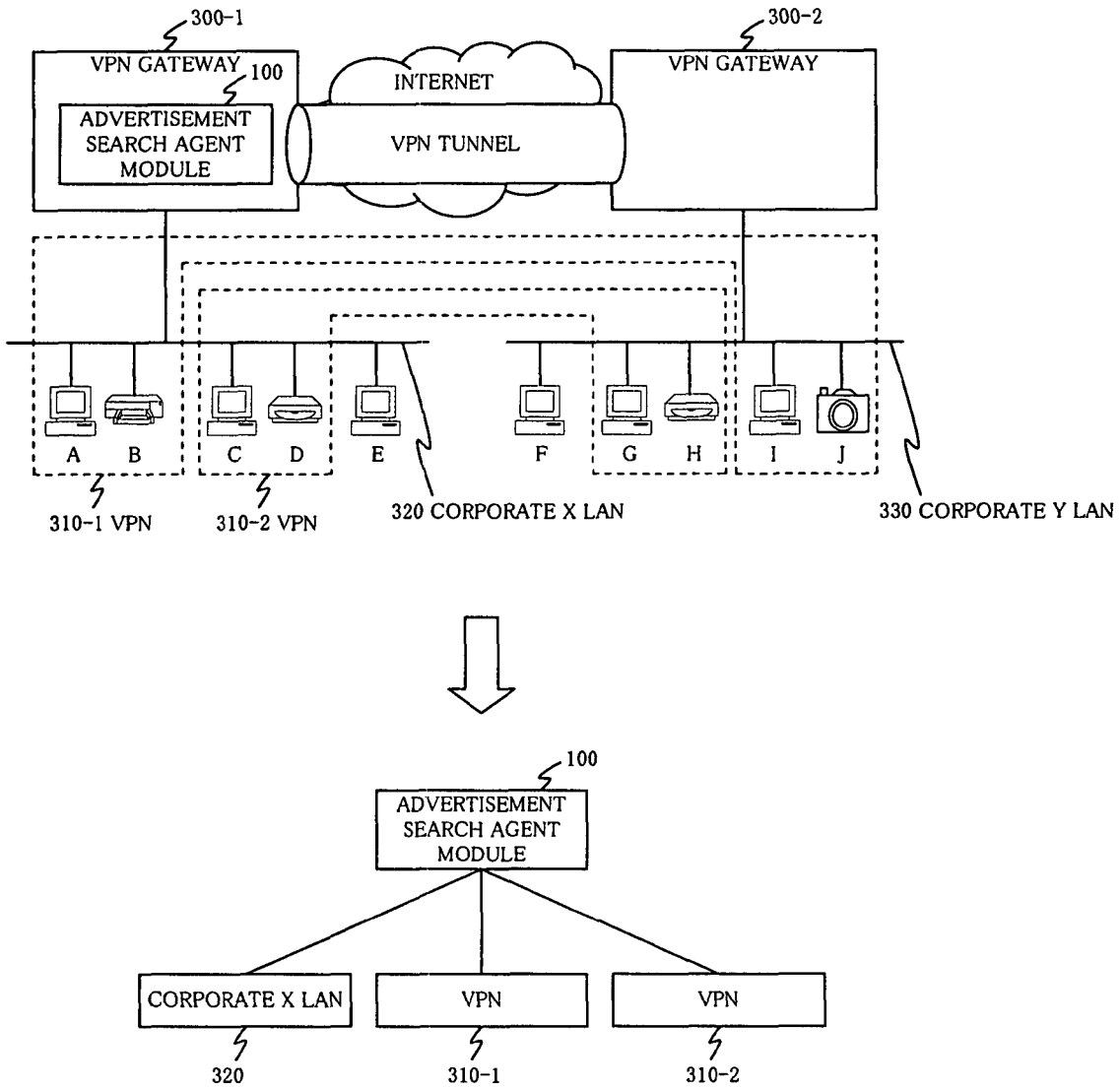
FIG. 3 is a diagram showing a connected configuration in which the advertisement search agent module shown in FIG. 1 is disposed in a VPN gateway.

As shown in FIG. 3, advertisement search agent module 100 shown in FIG. 1 is disposed in VPN gateway 300-1. Advertisement search agent module 100 can send and receive broadcast and multicast messages to and from LAN 320 of corporation X and VPNs 310-1, 310-2. In FIG. 3, LAN 320 of corporation X and VPNs 310-1, 310-2 serve as monitoring domains of advertisement search agent module 100.

Internal details of advertisement search agent module 100 shown in FIG. 1 will be described below.

As shown in FIG. 1, advertisement search agent module 100 comprises advertisement search message acquisition unit 110, message DB 120, node connection monitoring unit 130, delivery message extractor 140, and message delivery unit 150.

Advertisement search message acquisition unit 110 acquires service advertisement messages and service search messages broadcast or multicast by all monitoring domains 210-1 through 210-*m*, and stores the acquired messages in message DB 120. If message DB 120 have already stored messages identical to the acquired messages, i.e., messages whose contents are identical to those delivered from nodes 211-1 through 211-*mn*, then advertisement search message acquisition unit 110 may discard the acquired messages.

If broadcast or multicast messages are messages that are broadcast or multicast in an application level such as file search messages of the P2P file sharing software, for example, then the acquisition of the broadcast or multicast messages is made possible by advertisement search message acquisition unit 110 which has at least a function to receive broadcast or multicast messages of the corresponding application.

The acquisition of messages broadcast or multicast in a network level which are messages with MAC addresses set to broadcast or multicast addresses is made possible by advertisement search message acquisition unit 110 which reads a file from a TUN/TAP device that is bridge-connected to network interfaces connected to monitoring domains 210-1 through 210-*m*.

Messages broadcast or multicast in a network level can also be acquired by monitoring, with PCAP, network interfaces connected to monitoring domains 210-1 through 210-*m*, using a PCAP library which is capable of capturing messages that have reached the network interfaces to be monitored.

If messages are acquired using the TUN/TAP device or PCAP, then it is possible to acquire up to the header information in layer 2 level of broadcast or multicast messages.

Message DB 120 stores messages acquired by advertisement search message acquisition unit 110 as a database. Message DB 120 accumulates therein advertisement messages and search messages of all nodes 211-11 through 211-*mn* connected to monitoring domains 210-1 through 210-*m* of advertisement search message acquisition unit 110.

As shown in FIG. 4, message DB 120 shown in FIG. 1 records therein the monitoring domains of advertisement search message acquisition unit 110 and the messages of service using nodes and service providing nodes which are connected to the monitoring domains, in association with each other. Specifically, message DB 120 stores therein the messages of service using nodes and service providing nodes which are connected to LAN 320 of corporation X and VPNs 310-1, 310-2 as the monitoring domains of advertisement search message acquisition unit 110. If advertisement search message acquisition unit 110 acquires messages using the TUN/TAP device or the like, then the header information in layer 2 level of messages is also stored in message DB 120.

Message DB 120 may not exist in the same node as the other components (advertisement search message acquisition unit 110, node connection monitoring unit 130, delivery message extractor 140, and message delivery unit 150) of advertisement search agent module 100. Rather, single message DB 120 may be incorporated in a database server or the like, and may be shared by a plurality of advertisement search message acquisition units 110, node connection monitoring units 130, delivery message extractors 140, and message delivery units 150, so that advertisement search agent module 100 can refer to messages acquired by delivery message extractors 140 of other advertisement search agent modules 100.

Figure 5:
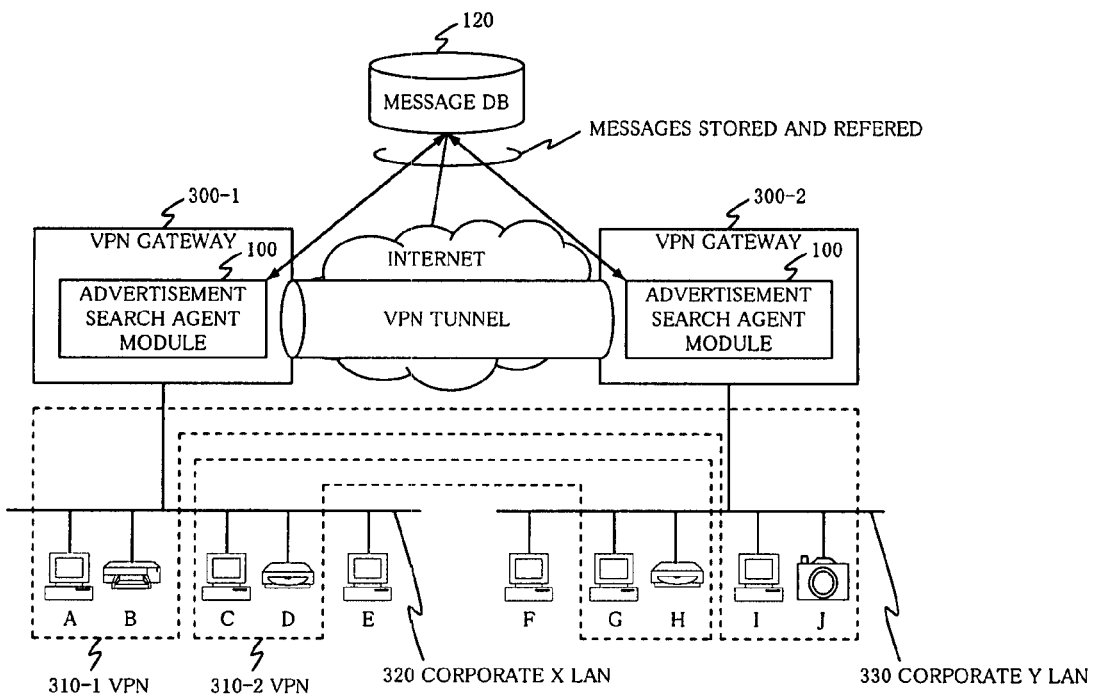
FIG. 5 is a diagram showing a configuration in which the message DB shown in FIG. 1 is shared by a plurality of advertisement search agent modules.

For example, in FIG. 5, different advertisement search agent modules 100 disposed in respective VPN gateways 300-1, 300-2 share message DB 120. In the configuration shown in FIG. 5, VPN gateway 300-1 can refer to broadcast or multicast messages through not only LAN 320 of corporation X and VPNs 310-1, 310-2, which serve as its own monitoring domains, but also LAN 330 of corporation Y that serves as a monitoring domain of VPN gateway 300-2.

Node connection monitoring unit 130 shown in FIG. 1 detects when a node is connected to and disconnected from a monitoring domain, and sends information of the monitoring domain to which the node is connected or from which the node is disconnected, the identifier of the node, and information as to whether the node is connected or disconnected, to message delivery unit 150. The identifier of the node makes it possible to uniquely identify the node regardless of the domain, and corresponds to, for example, a MAC address or a node ID prepared in an application.

The connection of a node to a monitoring domain and the disconnection of a node from a monitoring domain may be detected as follows: If a domain connection terminal is managed by a particular management server, then node connection monitoring unit 130 can monitor the connection of a node by being notified of a change in the domain connection terminal from the management server. If advertisement search agent module 100 is disposed in VLAN switch 230 or VPN gateways 300-1 through 300-2, then node connection monitoring unit 130 can monitor the connection of a node by monitoring a setting change of VLAN switch 230 or VPN gateways 300-1 through 300-2.

Delivery message extractor 140 is instructed by message delivery unit 150 to extract a message to be delivered by message delivery unit 150, and transfers the extracted message to message delivery unit 150.

Delivery message extractor 140 extracts only a message of a node related to a connected domain or a disconnected domain from message DB 120, thereby preventing a message of a node not related to the connected domain or the disconnected domain from being delivered to the domain.

Specifically, delivery message extractor 140 has first and second extracting functions, to be described below, and extracts a message to be delivered by message delivery unit 150 using at least one of the first and second extracting functions. When delivery message extractor 140 transfers a message to message delivery unit 150, delivery message extractor 140 informs message delivery unit 150 of the extracting function that is used to extract the message.

The first extracting function is a function for delivery message extractor 140 to extract, from message DB 120, a search message or an advertisement message broadcast or multicast to the connected or disconnected node in any monitoring domain in the past, as a message to be transmitted by message delivery unit 150.

For example, if advertisement search agent module 100 is positioned as shown FIG. 3 and the messages shown in FIG. 4 are stored in message DB 120, then when terminal E is connected to VPN 310-2, the message No. 7 shown in FIG. 4 is extracted as a message to be transmitted by message delivery unit 150.

The second extracting function is a function for delivery message extractor 140 to extract, from message DB 120, a message broadcast or multicast in any monitoring domain in the past by a node connected to the monitoring domain before a node is connected thereto or disconnected therefrom, as a message to be transmitted by message delivery unit 150.

Delivery message extractor 140 is initially required to recognize a node connected to a domain to which a node is newly connected or from which a node is newly disconnected. Specifically, if advertisement search agent module 100 is disposed in a VLAN switch or a VPN gateway and each domain is constructed as a virtual domain, e.g., a MAC address base VLAN or a layer 2 level VPN, then the identifier such as a MAC address or the like of a node connected to a domain in question (VLAN or layer 2 level VPN) can be recognized by confirming settings of the VLAN switch or the VPN gateway. If a domain is constructed as a virtual LAN by Softether, then the identifier (MAC address) of a node connected to a domain in question (virtual LAN) can be recognized by checking with a server which manages the virtual LAN.

For example, if advertisement search agent module 100 is positioned as shown FIG. 3 and the messages shown in FIG. 4 are stored in message DB 120, then when terminal E is connected to VPN 310-2, delivery message extractor 140 recognizes nodes connected to a domain as domains C, D, G, H. Then, delivery message extractor 140 extracts the messages Nos. 4, 5, 6, 8, 9, 10 shown in FIG. 4 as messages to be transmitted to these nodes by message delivery unit 150, from message DB 120.

After delivery message extractor 140 has extracted messages using at least one of the first and second extracting functions, delivery message extractor 140 transfers the extracted messages directly to message delivery unit 150. Delivery message extractor 140 also selects a message from the extracted messages according to a third extracting function, to be described below, and transfers the selected message to message delivery unit 150.

The third extracting function is a function for delivery message extractor 140 to select a message from the messages extracted by the first and second extracting functions, in view of whether a node is connected or disconnected and the type of a connected or disconnected node, i.e., whether a connected or disconnected node is a service providing node or a service using node.

Figure 6:
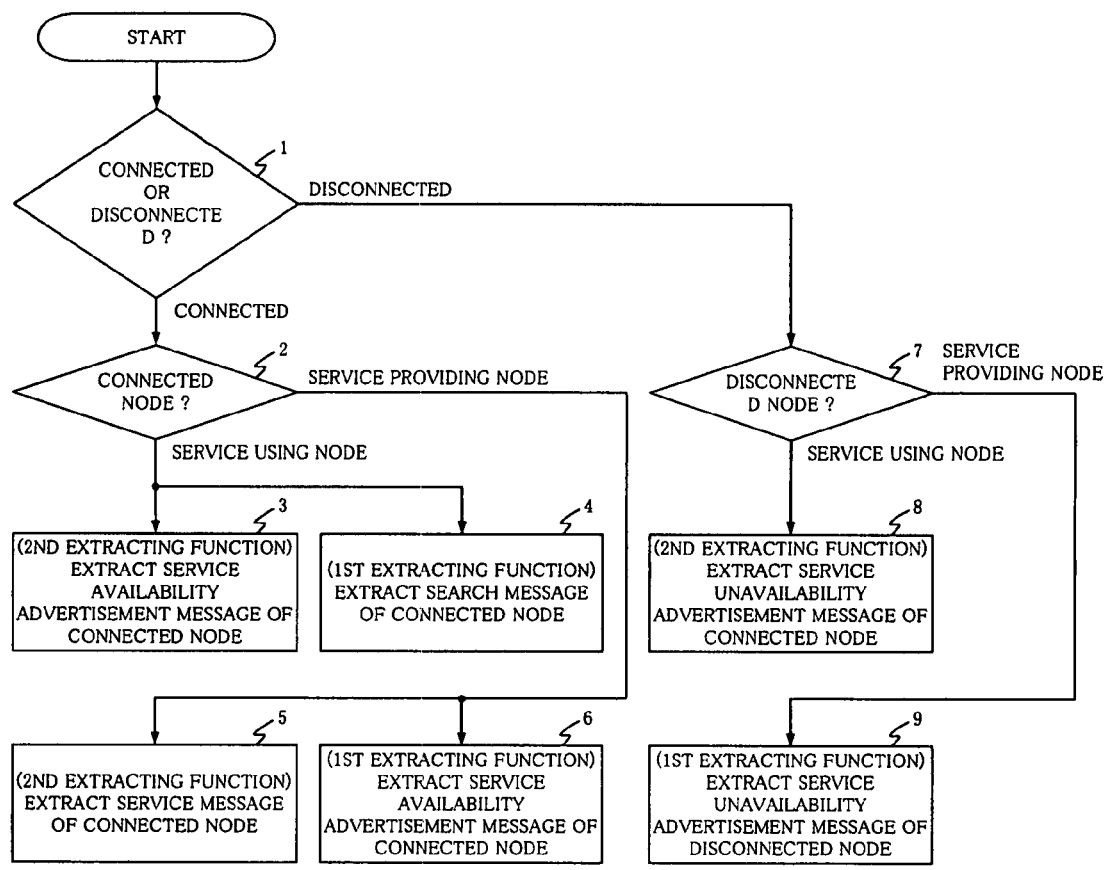
FIG. 6 is a flowchart of a process of extracting a message using a third extracting function in a delivery message extractor of the advertisement search agent module shown in FIG. 1.

A process of extracting a message using the third extracting function of delivery message extractor 140 of advertisement search agent module 100 shown in FIG. 1 will be described below with reference to FIG. 6.

First, it is determined in step 1 whether a node is connected or disconnected. If it is judged that a node is connected, then it is determined in step S2 whether the connected node is a service using node or a service providing node.

If it is judged that the connected node is a service using node in step 2, then a service availability advertisement message is selected from the messages extracted using the second extracting function in step 3 and a search message is selected from the messages extracted using the first extracting function in step 4.

If it is judged that the connected node is a service providing node in step 2, then a search message is selected from the messages extracted using the second extracting function in step 5 and a service availability advertisement message is selected from the messages extracted using the first extracting function in step 6.

If it is judged that a node is disconnected in step 1, then it is judged in step 7 whether the disconnected node is a service using node or a service providing node.

If it is judged that the disconnected node is a service using node in step 7, then no message is selected from the messages extracted using the first extracting function and a service unavailability advertisement message is selected from the messages extracted using the second extracting function in step 8.

If it is judged that the disconnected node is a service providing node in step 7, then a service unavailability advertisement message is selected from the messages extracted using the first extracting function in step 9, and no message is selected from the messages extracted using the second extracting function.

It can be recognized whether a connected or disconnected node is a service providing node or a service using node by referring to the messages stored in message DB 120 for example. Nodes with only search messages stored in message DB 120 can be judged as service using nodes. Nodes with at least one of service availability messages and service unavailability messages stored in message DB 120 can be judged as service providing nodes. For example, in message DB 120 shown in FIG. 4, nodes A, C, E, G, and I are service using nodes, and nodes B, D, H, and J are service providing nodes.

For selecting a message from the messages extracted by the first and second extracting functions, delivery message extractor 140 may select a message simply in view of whether a node is connected or disconnected, without regard to the type of a connected or disconnected node. In this case, step 2 and step 7 shown in FIG. 6 are skipped, and if it is judged in step 1 that a node is connected, the messages shown in steps 3 through 6 are selected. If it is judged in step 1 that a node is disconnected, the messages shown in steps 8, 9 are selected.

Message delivery unit 150 will be described below.

When message delivery unit 150 is notified of the connection or disconnection of a node from node connection monitoring unit 130, message delivery unit 150 instructs delivery message extractor 140 to extract a message and delivers the message transferred from delivery message extractor 140.

Message delivery unit 150 delivers the message transferred from delivery message extractor 140 to only the connected or disconnected node or the domain to or from which the node is connected or disconnected, thereby preventing messages transmitted in the domain to or from which the node is connected or disconnected, from being delivered to nodes unrelated to the domain.

A process of delivering a message in message delivery unit 150 will be described in specific detail below. Message delivery unit 150 has at least one of a first delivery function (c) and a second delivery function (d) described below, and delivers a message using the function.

(c) A function to deliver a message transferred from delivery message extractor 140 directly to a domain.

(d) A function to deliver a message transferred from delivery message extractor 140 to a connected or disconnected node after converting a message satisfying a particular condition into a unicast message.

When the delivery function (c) is used, since all messages transferred from delivery message extractor 140 are broadcast or multicast messages, all messages delivered from message delivery unit 150 are also broadcast or multicast messages. Message delivery unit 150 delivers a message to a domain to or from which a node is connected or disconnected.

For example, if advertisement search message acquisition unit 110 has acquired up to the header information in layer 2 level of a broadcast or multicast message using the TUN/TAP device, PCAP, or the like, then message delivery unit 150 delivers the message directly without changing the header information in layer 2 level of the acquired broadcast or multicast message. In this case, though the message is delivered from advertisement search message acquisition unit 110, its transmission source MAC address is delivered as the transmission source MAC address of the service using node or the service providing node which has broadcast or multicast the message.

When the delivery function (c) is used, message delivery unit 150 converts messages extracted using the second extracting function, of the messages transferred from delivery message extractor 140, into unicast messages, and delivers the unicast messages to a connected or disconnected node. Specifically, messages that are converted into unicast messages include the following three messages (e) through (g):

(e) a service availability advertisement message of a node already connected to a domain;

(f) a search message of a node already connected to a domain; and (g) a service unavailability advertisement message of a node already connected to a domain.

For example, if advertisement search message acquisition unit 110 has acquired up to the header information in layer 2 level of a broadcast or multicast message using the TUN/TAP device, PCAP, or the like, then message delivery unit 150 converts the destination MAC address of the acquired broadcast or multicast message (the header information in layer 2 level) into a connected or disconnected MAC address, and delivers the message. At the time advertisement search message acquisition unit 110 has acquired the message, the destination MAC address is a broadcast or multicast address. Message delivery unit 150 does not convert a message extracted using the first extracting function, which does not satisfy the condition of not changing the destination MAC address and the header information in other layers, and broadcasts or multicasts the message transferred to a domain to which a node is connected or a domain from which a node is disconnected.

How a connected or disconnected node, and a node connected to a domain to or from which a node is connected or disconnected, immediately detect a change in an available service when the node is connected and when the node is disconnected will be described below.

First, operation at the time a node is connected will be described below.

When a message extracted using the first extracting function is transferred from message extractor 140 to message delivery unit 150, message delivery unit 150 broadcasts or multicasts the transferred message to a domain to which the node is newly connected. At this time, the message selected in at least one of step 4 and step 6 shown in FIG. 6 is transferred to message delivery unit 150.

As a result, a search message of the newly connected node is received by all nodes already connected to the domain to which the node is newly connected. A response message in response to the search message is transmitted from a service providing node already connected to the domain to which the node is connected to the newly connected node. Therefore, a newly connected service using node can discover services available in the domain to which the node is connected immediately after the node is connected.

A service availability advertisement message of the newly connected node is sent to all nodes already connected to the domain to which the node is newly connected. Because of the service availability advertisement message sent, a service using node already connected to the domain to which the node is connected can detect services provided by the newly connected node immediately after the newly connected node is connected to the domain.

When a message extracted using the second extracting function is transferred from message extractor 140 to message delivery unit 150, message delivery unit 150 converts the transferred message into a unicast message and transmits the unicast message to the newly connected node. At this time, the message selected in at least one of step 3 and step 5 shown in FIG. 6 is transferred to message delivery unit 150.

As a result, the newly connected node receives a service availability advertisement message of the node already connected to the domain to which the node is connected, and can detect a service available in the domain to which the node is connected immediately after the node is connected.

The newly connected node receives a search message of a service using node already connected to the domain to which the node is connected. A response message in response to the search message received by the newly connected node is transmitted, allowing the already connected node to detect a service provided by the newly connected node.

Next, operation at the time a node is disconnected will be described below.

When a message extracted using the first extracting function is transferred from message extractor 140 to message delivery unit 150, message delivery unit 150 broadcasts or multicasts the transferred message to a domain from which the node is disconnected. At this time, the message selected in step 9 shown in FIG. 6 is transferred to message delivery unit 150.

As a result, a service using node connected to the domain from which the node is disconnected receives a service unavailability advertisement message which has been broadcast or multicast, and hence is capable of knowing that a service provided by the disconnected node has become unavailable immediately after the node is disconnected.

When a message extracted using the second extracting function is transferred from message extractor 140 to message delivery unit 150, message delivery unit 150 converts the transferred message into a unicast message and transmits the unicast message to the disconnected node. At this time, the message selected in step 8 shown in FIG. 6 is transferred to message delivery unit 150.

As a result, since the disconnected node receives a service unavailability advertisement message, it is capable of knowing that a service provided in the domain from which the node is disconnected has become unavailable immediately after the node is disconnected.

When a node is disconnected from a domain, messages may be extracted using both the first extracting function and the second extracting function, making it possible to handle the situation when either a service providing node or a service using node is disconnected. At this time, messages are extracted in both step 8 and step.

Advertisement search agent module 100 according to the first embodiment described above offers the following advantages:

Advertisement search agent module 100 has node connection monitoring unit 130 for detecting when a service providing node and a service using node are connected to a monitoring domain and disconnected from a monitoring domain, and recognizing the domain to or from which the node is connected or disconnected and the identifier of the node, delivery message extractor 140 for extracting either one or both of a message broadcast or multicast in the past by the node, and a message broadcast or multicast in the past by another node connected to the domain to or from which the node is connected or disconnected, based on the identifier of the node and the domain to or from which the node is connected or disconnected as recognized by node connection monitoring unit 130, and message delivery unit 150 for broadcasting or multicasting a message extracted by delivery message extractor 140 to the domain to or from which the node is connected or disconnected if the message is a message transmitted by the connected or disconnected node, and transmitting a message extracted by delivery message extractor 140 to the connected or disconnected node if the message is a message delivered by another node connected to the domain to which the node is connected or the domain from which the node is disconnected. When a service providing node is newly connected to a domain, node connection monitoring unit 130 detects the connection and recognizes the node identifier of the service providing node and the domain to which the node is connected. Delivery message extractor 140 extracts at least one of (A) a service availability advertisement message broadcast or multicast in the past by the service providing node and (B) a search message broadcast or multicast in the past by another node connected to the domain to which the node is connected. If the message extracted by delivery message extractor 140 is the message (A), then message delivery unit 150 broadcasts or multicasts the extracted message to the domain to which the service providing node is connected. If the message extracted by delivery message extractor 140 is the message (B), then message delivery unit 150 broadcasts or multicasts the extracted message to the service providing node.

Consequently, when the service providing node is newly connected to the domain, another node already connected to the domain to which the service providing node is connected can discover a service provided by the service providing node immediately after the service providing node is connected.

When a node is connected or disconnected, delivery message extractor 140 and message delivery unit 150 according to the present embodiment either (i) extracts only a message of a node connected to a domain to or from which the node is connected or disconnected, and delivers the extracted message only to the connected or disconnected node, or (ii) extracts only a message of the connected or disconnected node, and delivers the extracted message to the domain to or from which the node is connected or disconnected.

Therefore, the message of the domain to or from which the node is connected or disconnected is prevented from being delivered to nodes unrelated to the domain, and the message of the connected or disconnected node is prevented from being delivered to nodes unrelated to the domain to or from which the node is connected or disconnected.

When a service using node is newly connected to a domain, accordingly, the newly connected service using node can discover only a service providing node connected to the domain. When a service providing node is newly connected to a domain, only a service using node connected to the domain can discover a service provided by the newly connected service providing node.

Furthermore, when node connection monitoring unit 130 detects the disconnection of a node from a monitoring domain, delivery message extractor 140 extracts a service unavailability advertisement message delivered in the monitoring domain in the past by the disconnected node or a service unavailability advertisement message delivered in the monitoring domain in the past by a node connected to the domain from which the node is disconnected. Message delivery unit 150 broadcasts or multicasts the extracted message to the domain from which the node is disconnected, or transmits the extracted message to the disconnected node.

Therefore, when a node is disconnected from a domain, if the disconnected node is a service providing node, then a service using node connected to the domain from which the node is disconnected is immediately able to recognize that the service provided by the disconnected node has become unavailable. When a node is disconnected from a domain, if the disconnected node is a service using node, then the disconnected node is immediately able to recognize the service provided by the domain from which the node is disconnected.

However, advertisement search agent module 100 according to the first embodiment suffers the following problems:

The first problem is that when a node is connected or disconnected, a service may not immediately be discovered or its unavailability may not immediately be detected depending on how messages are stored in message DB 120.

In the first embodiment, advertisement search agent module 100 is only capable of delivering messages that are stored in message DB 120 at the time a node is connected or disconnected. Therefore, when a service providing node is newly connected to a domain, if a service availability advertisement message of the service providing node or a service search message of a node connected to the domain to which the service providing node is connected is not registered in advance in message DB 120, then the node connected to the domain to which the service providing node is connected cannot immediately discover a service provided by the newly connected service providing node. When a service providing node is disconnected from a domain, if a service unavailability advertisement message of the service providing node is not stored in message DB 120 at the time the service providing node is disconnected, then a node connected to the domain from which the service providing node is disconnected cannot immediately detect the unavailability of the service provided by the service providing node. The above situation applies when a service using node is connected to or disconnected from a domain.

The second problem is that when a node is connected to a domain, advertisement search agent module 100 delivers a search message to immediately discover a service (if the connected node is a service providing node, advertisement search agent module 100 transmits a search message delivered in the past by a node already connected to the domain to which the node is connected, and if the connected node is a service using node, advertisement search agent module 100 broadcasts or multicasts a search message delivered in the past by the connected node to the domain to which the node is connected), but advertisement search agent module 100 may not be able to discover a service by delivering the search message depending on how an application is installed on the node.

The reasons for the above problem are as follows: When advertisement search agent module 100 attempts to discover a service by delivering a search message, a service providing node transmits a response message in response to the search message received from advertisement search agent module 100 to a service using node. If an application on the service using node is installed in a manner to be able to receive a response message at all times, then the service using node can discover a service when it receives a response message. However, if an application on the service using node is installed in a manner to be able to receive a response message only for a certain time after the service using node has transmitted a search message, then the service using node discards a received response message after elapse of the certain time. In this case, the service using node fails to discover a service.

An advertisement search agent module according to a second embodiment of the present invention which can solve the above first and second problems will be described below.

2nd Embodiment

Unlike the advertisement search agent module according to the first embodiment, the advertisement search agent module according to the second embodiment can deliver not only messages actually delivered from nodes in the past, but also messages generated by the advertisement search agent module itself.

Figure 7:
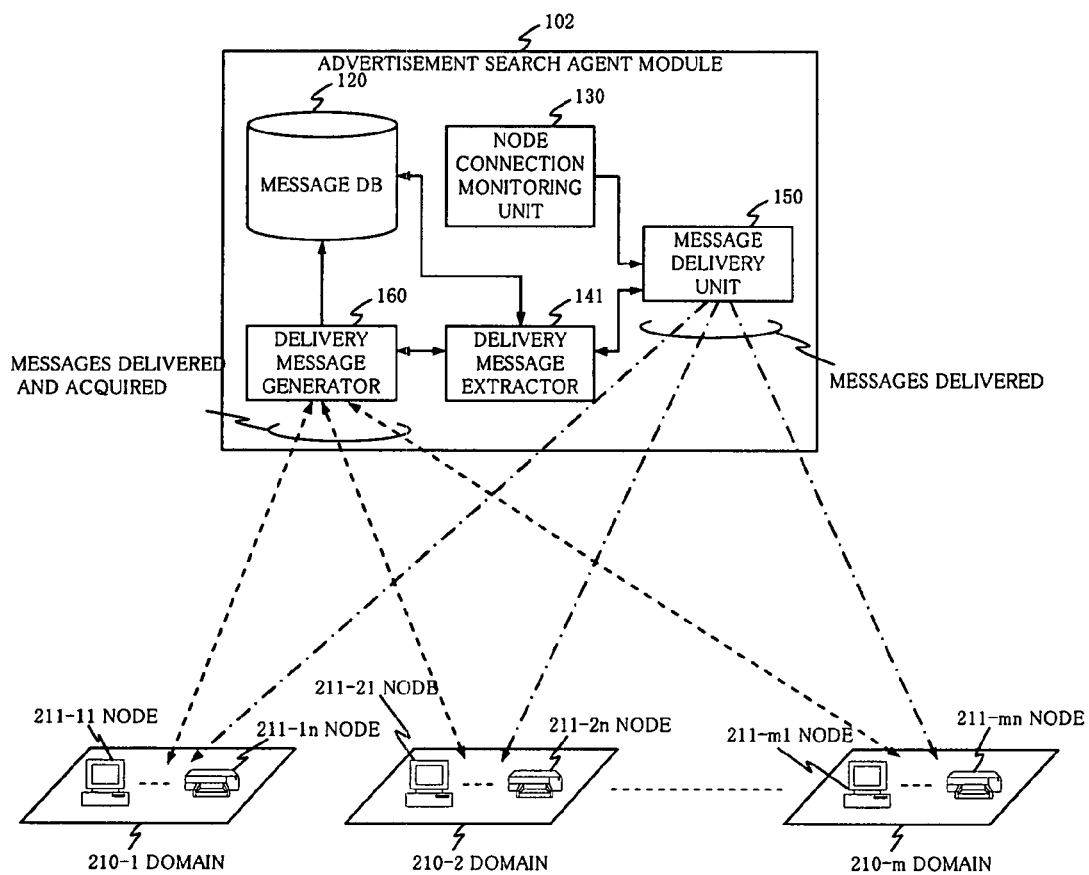
FIG. 7 is a block diagram of an advertisement search agent module according to a second embodiment of the present invention.

As shown in FIG. 7, unlike advertisement search agent module 100 according to the first embodiment, advertisement search agent module 102 according to the second embodiment does not have advertisement search message acquisition unit 110 for acquiring messages broadcast or multicast by nodes connected to monitoring domains, but delivery message generator 160 for generating a service availability advertisement message and a service unavailability advertisement message. Furthermore, advertisement search agent module 102 has delivery message extractor 141 whose function is different from the function of delivery message extractor 140 according to the first embodiment.

Delivery message extractor 141 and delivery message generator 160 of advertisement search agent module 102 shown in FIG. 7 will be described below. Other components of advertisement search agent module 102 are identical to those according to the first embodiment, and will not be described in detail below.

Delivery message extractor 141 has a function to instruct delivery message generator 160 to generate a message, in addition to the function of delivery message extractor 140 according to the first embodiment. Delivery message extractor 141 also has at least one of a first message generation instructing function to specify a domain to which a node is connected or a domain from which a node is disconnected as a domain for which a message is to be generated and to instruct delivery message generator 160 to generate a message for the domain for which a message is to be generated, and a second message generation instructing function to specify a connected or disconnected node as a node for which a message is to be generated and to instruct delivery message generator 160 to generate a message for the node.

Instructions given from delivery message extractor 141 to delivery message generator 160 include a node or a domain for which a message is to be generated, and the type of a message to be generated, i.e. whether it is a service availability advertisement message or a service unavailability advertisement message).

Delivery message extractor 141 operates differently when it refers to message DB 120 and when it does not refer to message DB 120.

Operation of delivery message extractor 141 when it does not refer to message DB 120 will first be described below. When delivery message extractor 141 is instructed by message delivery unit 150, delivery message extractor 141 immediately instructs delivery message generator 160 to generate a message, and transfers the message generated by delivery message generator 160 to message delivery unit 150.

Delivery message extractor 141 instructs delivery message generator 160 to generate a message differently in the following two cases (j), (k), as message extractor 140 according to the first embodiment extracts a message differently:

(j) if a node is connected and if a node is disconnected; and (k) if a connected or disconnected node is a service using node and if a connected or disconnected node is a service providing node.

Delivery message extractor 141 may instruct delivery message generator 160 to generate a message in view of the case (j) only or in view of both the cases (j), (k).

A process of generating a message in delivery message generator 160 shown in FIG. 7 will be described below with reference to FIG. 8.

In step 11, node connection monitoring unit 130 determines whether a node is connected or disconnected. If it is judged that a node is connected, then it is determined in step 12 whether the connected node is a service using node or a service providing node. For example, a search message is delivered from delivery message extractor 141 to the connected node. If a response message returns in response to the search message within a preset time, then the connected node is judged as a service providing node. If a response message does not return in response to the search message within the preset time, then the connected node is judged as a service using node.

If it is judged that a service using node is connected, then delivery message generator 160 is instructed in step 13 to generate a service availability advertisement message of a node already connected to the domain to which the service using node is connected. Instructions sent to delivery message generator 160 include the domain to which the service using node is connected as a domain for which a message is to be generated, and the service availability advertisement message as the type of a message to be generated.

If it is judged that a service providing node is connected, then delivery message generator 160 is instructed in step 14 to generate a service availability advertisement message of the connected node. Instructions sent to delivery message generator 160 include the connected node as a node for which a message is to be generated, and the service availability advertisement message as the type of a message to be generated.

If it is judged that a node is disconnected in step 11, then it is judged in step 15 whether the disconnected node is a service using node or a service providing node.

If it is judged that a service using node is disconnected, then delivery message generator 160 is instructed in step 16 to generate a service unavailability advertisement message of a node connected to the domain from which the service using node is disconnected. Instructions sent to delivery message generator 160 include the domain from which the service using node is disconnected as a domain for which a message is to be generated, and the service unavailability advertisement message as the type of a message to be generated.

If it is judged that a service providing node is disconnected, then delivery message generator 160 is instructed in step 17 to generate a service unavailability advertisement message of the disconnected node. Instructions sent to delivery message generator 160 include the disconnected node as a node for which a message is to be generated, and the service unavailability advertisement message as the type of a message to be generated.

Figure 8:
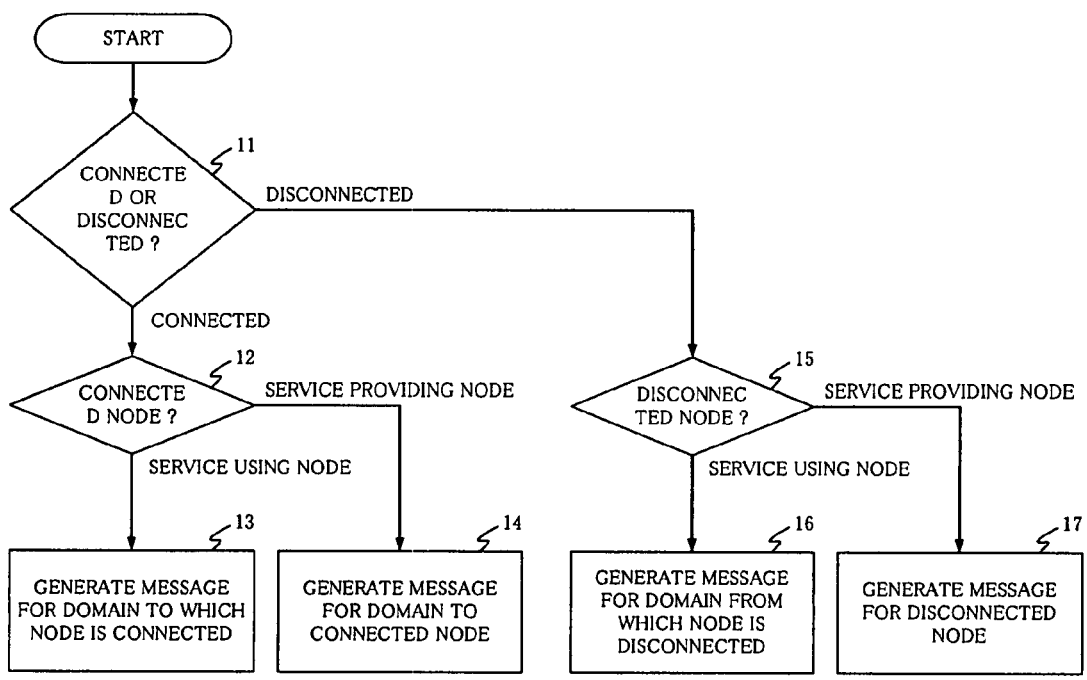
FIG. 8 is a flowchart of a process of generating a message in a delivery message generator shown in FIG. 7.

Steps 12, 15 shown in FIG. 8 can be dispensed with. If steps 12, 15 are dispensed with, then both steps 13, 14 are executed when a node is connected, and both steps 16, 17 are executed when a node is disconnected.

If delivery message extractor 141 does not refer to message DB 120, then advertisement search agent module 102 may not have message DB 120.

Operation of delivery message extractor 141 when it refers to message DB 120 will be described below. When delivery message extractor 141 instructs delivery message generator 160 to generate a message, it also instructs message DB 120 to store the generated message.

Delivery message extractor 141 operates differently in the following two cases (p), (1):

(p) if it is guaranteed that a service availability advertisement message and a service unavailability advertisement message of all service providing nodes connected to any monitoring domain immediately before a node is connected or disconnected are stored in message DB 120; and (q) if it is not guaranteed that the above messages are stored in message DB 120.

Figure 9:
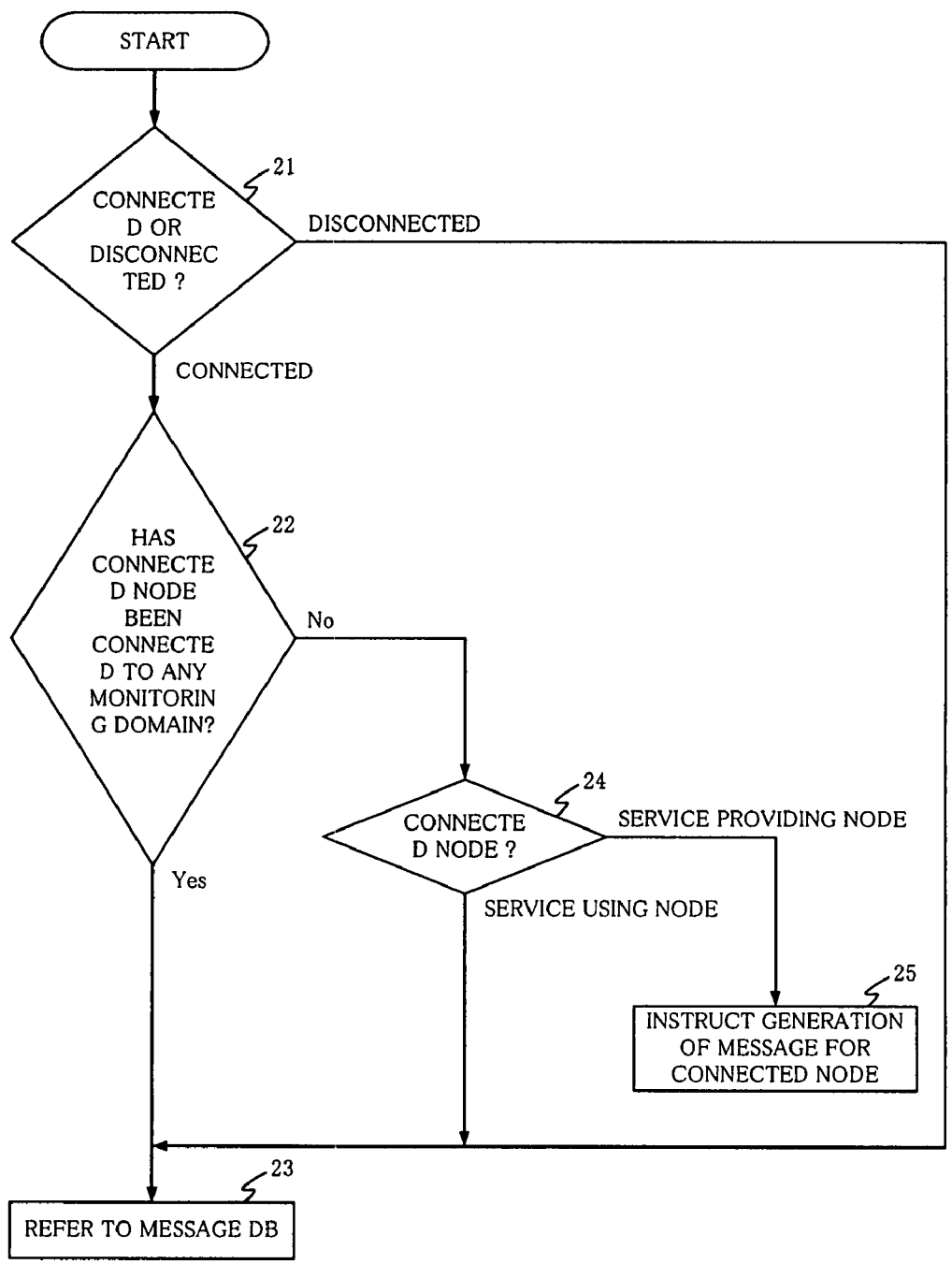
FIG. 9 is a flowchart of a process of extracting a message in a delivery message extractor shown in FIG. 7 when it is guaranteed that both a service availability advertisement message and a service unavailability advertisement message of all service providing nodes connected to either monitoring domain immediately before a node connection or disconnection occurs, are stored in a message DB.

A process of extracting a message in delivery message extractor 141 shown in FIG. 7 in the case (p) will be described below with reference to FIG. 9.

In step 21, node connection monitoring unit 130 determines whether a node is connected or disconnected. If it is judged that a node is connected, then it is determined in step 22 whether the connected node has been connected to any monitoring domain in the past. For example, message DB 120 is referred to and checked to see whether or not it stores a service availability advertisement message or a service unavailability advertisement message of the connected node, for thereby determining whether the connected node has been connected to any monitoring domain in the past.

If it is judged in step 22 that the connected node has already been connected to any monitoring domain, then delivery message extractor 141 refers to message DB 120, extracts a message from message DB 120, and transfers the extracted message to message delivery unit 150 in step 23 in the same manner as delivery message extractor 140 according to the first embodiment.

If it is judged in step 22 that the connected node has not been connected to any monitoring domain in the past, then it is judged in step 24 whether the connected node is a service using node or a service providing node.

If it is judged that a service using node is connected, then step 24 is executed.

If it is judged that a service providing node is connected, then delivery message extractor 141 instructs delivery message generator 160 in step 25 to generate a message for the connected node and transfer the generated message to message delivery unit 150. When delivery message generator 160 is instructed to generated a message, it is also instructed to store the generated message into message DB 120. Therefore, it is guaranteed at all times that message DB 120 holds both a service availability advertisement message and a service unavailability advertisement message of all service providing nodes connected to any monitoring domain immediately before the node is connected or disconnected.

If it is judged in step 21 that a node is disconnected, then step 23 is executed.

At least one of steps 22, 24 may be dispensed with. If only step 22 is dispensed with, then steps 24, 25 are executed at all times. If only step 24 is dispensed with, then step 25 is executed at all times if the connected node is a new node in step 22. If both steps 22, 24 are dispensed with, then step 25 is executed at all times if a node is connected.

Figure 10:
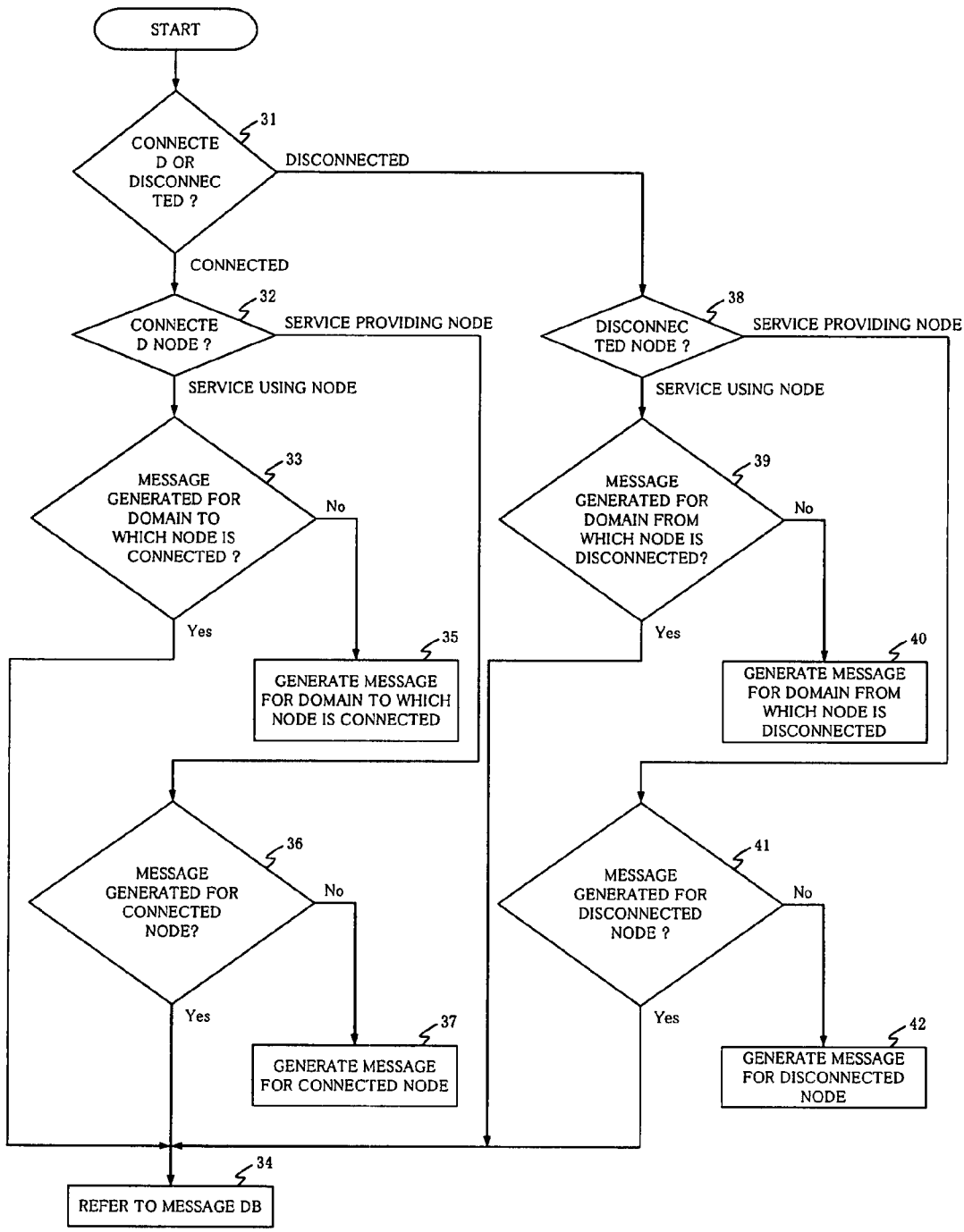
FIG. 10 is a flowchart of a process of extracting a message in the delivery message extractor shown in FIG. 7 when it is not guaranteed that both a service availability advertisement message and a service unavailability advertisement message of all service providing nodes connected to either monitoring domain immediately before a node connection or disconnection occurs, are stored in a message DB.

A process of extracting a message in delivery message extractor 141 in the case (q) will be described below with reference to FIG. 10. For delivery message extractor 141 to operate in the case (q), delivery message extractor 141 holds a record of domains and nodes for which delivery message extractor 141 has instructed delivery message generator 160 to generate messages.

In step 31, node connection monitoring unit 130 determines whether a node is connected or disconnected. If it is judged that a node is connected, then it is determined in step 32 whether the connected node is a service using node or a service providing node.

If it is judged that a service using node is connected, then it is determined in step 33 whether or not delivery message extractor 141 has already instructed delivery message generator 160 to generate a message for the domain to which the node is connected.

If it is judged that delivery message extractor 141 has already instructed delivery message generator 160, then delivery message extractor 141 refers to message DB 120, extracts a message from message DB 120, and transfers the extracted message to message delivery unit 150 in step 34 in the same manner as delivery message extractor 140 according to the first embodiment.

If it is judged that delivery message extractor 141 has not already instructed delivery message generator 160, then delivery message extractor 141 instructs delivery message generator 160 to generate a service availability advertisement message of a node already connected to the domain to which the node is connected in step 35. Instructions sent to delivery message generator 160 include the domain to which the node is connected as a domain for which a message is to be generated, and the service availability advertisement message as the type of a message to be generated.

If it is judged in step 32 that a service providing node is connected, then it is determined in step 36 whether or not delivery message extractor 141 has already instructed delivery message generator 160 to generate a message for the connected service providing node.

If it is judged that delivery message extractor 141 has already instructed delivery message generator 160, then step 34 is executed.

If it is judged that delivery message extractor 141 has not already instructed delivery message generator 160, then delivery message extractor 141 instructs delivery message generator 160 to generate a service availability advertisement message of the connected node. Instructions sent to delivery message generator 160 include the connected node for which a message is to be generated, and the service availability advertisement message as the type of a message to be generated.

If it is judged in step 31 that a node is disconnected, then it is determined in step 38 whether the disconnected node is a service using node or a service providing node.

If it is judged that a service using node is disconnected, then it is determined in step 39 whether or not delivery message extractor 141 has already instructed delivery message generator 160 to generate a message for the domain from which the node is disconnected.

If it is judged that delivery message extractor 141 has already instructed delivery message generator 160, then step 34 is executed.

If it is judged that delivery message extractor 141 has not already instructed delivery message generator 160, then delivery message extractor 141 instructs delivery message generator 160 to generate a service unavailability advertisement message of a node already connected to the domain from which the node is disconnected in step 40. Instructions sent to delivery message generator 160 include the domain from which the node is disconnected as a domain for which a message is to be generated, and the service unavailability advertisement message as the type of a message to be generated.

If it is judged in step 38 that a service providing node is disconnected, then it is determined in step 41 whether or not delivery message extractor 141 has already instructed delivery message generator 160 to generate a message for the disconnected service providing node.

If it is judged that delivery message extractor 141 has already instructed delivery message generator 160, then step 34 is executed.

If it is judged that delivery message extractor 141 has not already instructed delivery message generator 160, then delivery message extractor 141 instructs delivery message generator 160 to generate a service unavailability advertisement message of the disconnected node. Instructions sent to delivery message generator 160 include the disconnected node for which a message is to be generated, and the service unavailability advertisement message as the type of a message to be generated.

Steps 32, 38 can be dispensed with. If steps 32, 38 are dispensed with, then both step 33 and the following steps and step 34 and the following steps are executed when a node is connected, and both step 39 and the following steps and step 41 and the following steps are executed when a node is disconnected.

When delivery message generator 160 is instructed to generate a message by delivery message extractor 141, delivery message generator 160 generate a message based on the instructions. When delivery message generator 160 is also instructed to store a message, delivery message generator 160 stores the generated message into message DB 120.

As with advertisement search agent module 100 according to the first embodiment, message DB 120 according to the second embodiment may not exist in the same node as the other components (advertisement search message acquisition unit 110, node connection monitoring unit 130, delivery message extractor 141, delivery message generator 160, and message delivery unit 150) of advertisement search agent module 102. Rather, single message DB 120 may be incorporated in a database server or the like, and may be shared by a plurality of advertisement search message acquisition units 110, node connection monitoring units 130, delivery message extractors 141, delivery message generators 160, and message delivery units 150, so that advertisement search agent module 102 can refer to messages generated by delivery message generators 160 of other advertisement search agent modules 102.

Delivery message generator 160 has an application protocol stack installed for at least detecting a service, of an application run on service using nodes and service providing nodes connected to monitoring domains, or in other words, a function installed to generate and deliver a search message for detecting a service and to interpret application-level contents of a response message in response the search message.

Delivery message generator 160 also has a function to generate and deliver a search message for detecting a service with the application protocol stack when delivery message generator 160 is instructed to generate a message, to interpret application-level contents of a response message in response the search message, and to generate a service availability advertisement message and a service unavailability advertisement message from the interpreted contents.

Delivery message generator 160 operates differently when a domain is specified for which a message is to be generated and when a node is specified for which a message is to be generated.

If a domain is specified for which a message is to be generated, then delivery message generator 160 generates a search message for detecting a service itself, and broadcasts or multicasts the generated search message to the specified domain.

Thereafter, application-level contents of all response messages in response to the search message are interpreted, and a service availability advertisement message and a service unavailability advertisement message are generated from the interpreted contents. Delivery message generator 160 generates a service availability advertisement message and a service unavailability advertisement message of all service providing nodes that are connected to the domain for which a message is to be generated at the time delivery message generator 160 is instructed to generate a message.

If a node is specified for which a message is to be generated, then delivery message generator 160 generates a search message for detecting a service itself, and unicasts the generated search message to the specified node.

Thereafter, application-level contents of all response messages in response to the search message are interpreted, and a service availability advertisement message and a service unavailability advertisement message are generated from the interpreted contents.

Operation of message delivery unit 150 also differs depending on whether a message generated by delivery message generator 160 is to be delivered to a domain or a node.

Consequently, message delivery unit 150 has a domain delivery function to deliver a message to a domain and a node delivery function to deliver a message to a node. If a message generated by delivery message generator 160 is to be delivered to a domain, the domain delivery function delivers the generated message to the domain. If a message generated by delivery message generator 160 is to be delivered to a node, the node delivery function delivers the generated message to the node. For delivering a message to a node using the node delivery function, the message is converted into a unicast message and the unicast message is delivered to the node.

Advertisement search agent module 102 according to the second embodiment described above offers the following advantages:

Advertisement search agent module 102 according to the second embodiment has delivery message generator 160 for generating a service availability advertisement message and a service unavailability advertisement message of service providing nodes connected to monitoring domains. When a node is connected to or disconnected from a monitoring domain, advertisement search agent module 102 delivers a message required for a node in a domain and the connected or disconnected node to immediately detect a change in an available service caused by the connection or disconnection of the node.

Even if a search message, a service availability message, or a service unavailability message of a node that has been connected to a monitoring domain, a node that is connected to a domain, or a node that is disconnected from a domain has not been acquired in advance, the node that has been connected to the monitoring domain, the node that is connected to the domain, or the node that is disconnected from the domain can detect a change in an available service immediately after the connection or the disconnection has occurred.

According to the present embodiment, a change in an available service of a node is detected at all times when a service availability advertisement message or a service unavailability advertisement message transmitted from advertisement search agent module 102 is received by each node. In other words, unlike the first embodiment, a change in an available service is not detected when a response message in response to a search message not transmitted from each node itself, i.e., a search message transmitted from advertisement search agent module 102, is received by each node. Even if an application on a service using node is installed in a manner to be able to receive a response message only for a preset time after the application has transmitted a search message, the service using node can detect a change in an available service immediately after the node is connected or disconnected.

The present invention as described above offers the following advantages:

According to the first advantage, when a service providing node is newly connected to a domain, another node already connected to the domain is able to discover a service provided by the service providing node immediately after the service providing node is connected.

The reason for the above first advantage is that advertisement search agent module 100 has node connection monitoring unit 130 for detecting the connection and disconnection of a service providing node and a service using node to and from a monitoring domain, and recognizing the connected or disconnected domain and the node identifier of the connected or disconnected node, delivery message extractor 140 for extracting at least one of a message broadcast or multicast in the past by the node and a message broadcast or multicast in the past by another node connected to the domain to or from which the node is connected or disconnected, based on the node identifier and the domain to or from which the node is connected or disconnected which are detected by node connection monitoring unit 130, and message delivery unit 150 for broadcasting or multicasting the message extracted by delivery message extractor 140 to the domain to or from which the node is connected or disconnected if the message extracted by delivery message extractor 140 is a message transmitted by the connected or disconnected node, and transmitting the message extracted by delivery message extractor 140 to the connected or disconnected node if the message extracted by delivery message extractor 140 is a message delivered by the other node connected to the domain to or from which the node is connected or disconnected. When a service providing node is newly connected to a domain, node connection monitoring unit 130 detects the connection and recognizes the node identifier of the service providing node and the domain to which the node is connected. Delivery message extractor 140 extracts at least one of (A) a service availability advertisement message broadcast or multicast in the past by the service providing node and (B) a search message broadcast or multicast in the past by another node connected to the domain to which the node is connected. If the message extracted by delivery message extractor 140 is the message (A), then message delivery unit 150 broadcasts or multicasts the extracted message to the domain to which the service providing node is connected. If the message extracted by delivery message extractor 140 is the message (B), then message delivery unit 150 broadcasts or multicasts the extracted message to the service providing node.

According to the second advantage, when a service using node is newly connected to a domain, the newly connected service using node is able to discover only a service providing node connected to the domain, and when a service providing node is newly connected to a domain, only a service using node connected to the domain is able to discover the service provided by the newly connected service providing node.

The reason for the second advantage is that when a node is connected or disconnected, delivery message extractor 140 and message delivery unit 150 either (i) extracts only a message of a node connected to a domain to or from which the node is connected or disconnected, and delivers the extracted message only to the connected or disconnected node, or (ii) extracts only a message of the connected or disconnected node, and delivers the extracted message to the domain to or from which the node is connected or disconnected. Therefore, the message of the domain to or from which the node is connected or disconnected is prevented from being delivered to nodes unrelated to the domain, and the message of the connected or disconnected node is prevented from being delivered to nodes unrelated to the domain to or from which the node is connected or disconnected.

According to the third advantage, when a node is disconnected from a domain, if the disconnected node is a service providing node, then a service using node connected to the domain from which the node is disconnected is immediately able to recognize that the service provided by the disconnected node has become unavailable. If the disconnected node is a service using node, then the disconnected node is immediately able to recognize the service provided by the domain from which the node is disconnected.

The reason for the third advantage is that when node connection monitoring unit 130 detects the disconnection of a node from a monitoring domain, delivery message extractor 140 extracts a service unavailability advertisement message delivered in the monitoring domain in the past by the disconnected node or a service unavailability advertisement message delivered in the monitoring domain in the past by a node connected to the domain from which the node is disconnected. Message delivery unit 150 broadcasts or multicasts the extracted message to the domain from which the node is disconnected, or transmits the extracted message to the disconnected node.

According to the fourth advantage, even if a search message, a service availability message, or a service unavailability message of a node that has been connected to a monitoring domain, a node that is connected to a domain, or a node that is disconnected from a domain has not been acquired in advance, the node that has been connected to the monitoring domain, the node that is connected to the domain, or the node that is disconnected from the domain can detect a change in an available service immediately after the connection or the disconnection has occurred.

The reason for the fourth advantage is that advertisement search agent module 102 has delivery message generator 160 for generating a service availability advertisement message and a service unavailability advertisement message of a service providing node connected to a monitoring domain. When a node is connected to or disconnected from the monitoring domain, advertisement search agent module 102 delivers a message for a node in a domain and the connected or disconnected node to immediately detect a change in an available service caused by the connection or disconnection of the node.

According to the fifth advantage, even if an application on a service using node is installed in a manner to be able to receive a response message only for a certain time after the service using node has transmitted a search message, the service using node can detect a change in an available service immediately after it is connected or disconnected.

The reason for the fifth advantage is that a node detects a change in an available service at all times by receiving a service availability advertisement message or a service unavailability advertisement message transmitted from advertisement search agent module 102, and does not detect a change in an available service by receiving a response message in response to a search message (a search message transmitted by advertisement search agent module 102) which has not been transmitted by the node itself.

While a preferred embodiment of the present invention has been described in specific terms, such description is for illustrative purpose only, and it is to be understood that changes and variations may be made without departing from the spirit or scope of the following claims.

What is claimed is:

1. An advertisement search agent system comprising:
   a message acquisition unit configured to acquire advertisement search messages including a search message, a service availability advertisement message, and a service unavailability advertisement message broadcast or multicast by a node connected to one of a plurality of domains;
   a message database configured to store the advertisement search messages acquired by said message acquisition unit;
   a node connection monitoring unit configured to detect a connection of a node to any one of the plurality of said domains;
   a delivery message extractor configured to execute at least one of a first extracting function configured to extract only said search message and said service availability advertisement message delivered from a connected node recently connected to a first domain, of said advertisement search messages stored in said message database, and configured to execute a second extracting function configured to recognize a second node connected to the first domain, and to extract only said search message and said service availability advertisement message delivered from the second node connected to said first domain, when the connection of said connected node to the first domain is detected by said node connection monitoring unit; and
   a message delivery unit configured to execute at least one of a first delivery function configured to deliver said search message and said service availability advertisement message extracted by said first extracting function of said delivery message extractor to the first domain, and configured to execute a second delivery function configured to deliver said search message and said service availability advertisement message extracted by said second extracting function of said delivery message extractor to the connected node, when the connection of said connected node to the first domain is detected by said node connection monitoring unit.

2. An advertisement search agent system according to claim 1, wherein said delivery message extractor is configured to execute a third extracting function configured to further extract said search message extracted from said advertisement search message delivered from the connected node and configured to further extract said service availability advertisement message from said advertisement search message delivered from the second node when the connected node is a service using node, and to further extract said service availability advertisement message from said advertisement search message delivered from the connected node and to further extract said search message from said advertisement search message delivered from the second node when the connected node is a service providing node.

3. An advertisement search agent system according to claim 1, wherein said message database stores advertisement search messages acquired by a plurality of said message acquisition units.

4. An advertisement search agent system according to claim 1, wherein when said message delivery unit is configured to deliver a message according to said second delivery function, said message delivery unit converts the message into a unicast message and delivers the unicast message.

5. An advertisement search agent system comprising:
a message acquisition unit configured to acquire advertisement search messages including a search message, a service availability advertisement message, and a service unavailability advertisement message broadcast or multicast by a node connected to one of a plurality of domains;
a message database configured to store the advertisement search messages acquired by said message acquisition unit;
a node connection monitoring unit configured to detect a disconnection of a node from any one of the plurality of said domains;
a delivery message extractor configured to execute at least one of a first extracting function configured to extract only said service unavailability advertisement message delivered from a disconnected node recently disconnected from a first domain, of said advertisement search messages stored in said message database, and configured to execute a second extracting function configured to recognize a second node connected to the first domain, and to extract only said service unavailability advertisement message delivered from the second node, when the disconnection of the disconnected node from the first domain is detected by said node connection monitoring unit; and
a message delivery unit configured to execute at least one of a first delivery function configured to deliver said service unavailability advertisement message extracted by said first extracting function of said delivery message extractor to the first domain, and a second delivery function configured to deliver said service unavailability advertisement message extracted by said second extracting function of said delivery message extractor to the disconnected node, when the disconnection of said disconnected node from the first domain is detected by said node connection monitoring unit.

6. An advertisement search agent system according to claim 5, wherein said delivery message extractor is configured to execute a third extracting function configured to extract said service unavailability advertisement message from the advertisement search message delivered from the second node when the disconnected node is a service using node, and to further extract said service unavailability advertisement message extracted from the advertisement search message delivered from the disconnected node and when the disconnected node is a service providing node.

7. An advertisement search agent system according to claim 5, wherein said message database stores advertisement search messages acquired by a plurality of said message acquisition units.

8. An advertisement search agent system according to claim 5, wherein when said message delivery unit configured is to deliver a message according to said second delivery function, said message delivery unit converts the message into a unicast message and delivers the unicast message.

9. An advertisement search agent system comprising:
a message acquisition unit configured to acquire advertisement search messages including a search message, a service availability advertisement message, and a service unavailability advertisement message broadcast or multicast by a node connected to one of a plurality of domains;
a message database configured to store the advertisement search messages acquired by said message acquisition unit;
a node connection monitoring unit configured to detect a connection of a node to any one of said plurality of domains and a disconnection of a node from any one of said plurality of domains;
a delivery message extractor configured to execute at least one of a first extracting function configured to extract only said search message and said service availability advertisement message delivered from a connected node recently connected to a first domain, of said advertisement search messages stored in said message database, when the connection of said connected node is detected by said node connection monitoring unit and to extract only said service unavailability advertisement message delivered from a disconnected node recently disconnected from the first domain, of said advertisement search messages stored in said message database, when the disconnection of said disconnected node is detected by said node connection monitoring unit, and the delivery message extractor is configured to execute a second extracting function configured to extract only said search message and said service availability advertisement message delivered from a second node connected to said first domain, of said advertisement search messages stored in said message database, when the connection of said connected node is detected by said node connection monitoring unit and to extract only said service unavailability advertisement message delivered from a third node connected to said first domain, of said advertisement search messages stored in said message database, when the disconnection of said disconnected node from the first domain is detected by said node connection monitoring unit; and
a message delivery unit configured to execute at least one of a first delivery function configured to deliver said search message and said service availability advertisement message extracted from said advertisement search message delivered from the connected node to the first domain, when the connection of said connected node is detected by said node connection monitoring unit, and to deliver said service unavailability message extracted from said service availability advertisement message delivered by the disconnected node to the first domain, when the disconnection of said disconnected node is detected by said node connection monitoring unit, and a second delivery function to deliver said search message and said availability advertisement message extracted from said service availability advertisement message delivered from the second node to the connected node, when the connection of said connected node is detected by said node connection monitoring unit, and to deliver said service unavailability advertisement message extracted from said service availability advertisement message delivered from the third node to the disconnected node, when disconnection of said disconnected node from the first domain is detected by said node connection monitoring unit.

10. An advertisement search agent system according to claim 9, wherein said delivery message extractor is further configured to extract said search message and said service availability advertisement message from said advertisement search message delivered from the connected node, when the connected node is a service using node, or to extract said search message and said service unavailability advertisement message from said advertisement search message delivered from the disconnected node, when the disconnected node is a service using node, and to further extract said service availability advertisement message and said search message from said advertisement search message delivered from the connected node, when the connected node is a service providing node, or to extract said service unavailability advertisement message and said search message from said advertisement search message delivered from the disconnected node, when the disconnected node is a service providing node.

11. An advertisement search agent system according to claim 9, wherein said message database stores advertisement search messages acquired by a plurality of said message acquisition units.

12. An advertisement search agent system according to claim 9, wherein when said message delivery unit is configured to deliver a message according to said second delivery function, said message delivery unit converts the message into a unicast message and delivers the unicast message.

13. An advertisement search agent system comprising:
a node connection monitoring unit configured to detect connection of a node to and disconnection of a node from a plurality of domains;
a delivery message extractor configured to execute either one or both of a first message generation instructing function configured to specify a domain to which a connected node is connected or a domain from which a disconnected node is disconnected as a domain for which a message is to be generated, and to instruct a message to be generated for said specified domain, and a second message generation instructing function configured to specify the connected or disconnected node as a node for which a message is to be generated, and to instruct a message to be generated for the connected or disconnected node, when the connection of the connected node or disconnection of said disconnected node is detected by said node connection monitoring unit;
a delivery message generator for generating a service availability advertisement message or a service unavailability advertisement message based on instructions to generate a message from said delivery message extractor; and
a message delivery unit having a domain delivery function to deliver a search message generated by said first message generation instructing function of said delivery message extractor to the domain to which the connected node is connected or from which said disconnected node is disconnected from, and a node delivery function to deliver a search message generated by said second message generation instructing function of said delivery message extractor to the connected node, when connection of said connected node is detected by said node connection monitoring unit, and to deliver a search message generated by said second message generation instructing function of said delivery message extractor to the disconnected node, when disconnection of said disconnected node is detected by said node detection monitoring unit.

14. An advertisement search agent system according to claim 13, wherein said delivery message extractor instructs said first message generation instructing function to generate a message when a service using node is connected or disconnected, and instructs said message generation instructing function to generate a message when a service providing node is connected or disconnected.

15. An advertisement search agent system according to claim 13, further comprising:
a message database configured to store messages generated by said delivery message generator;
wherein said delivery message extractor is further configured to execute a function to store a node or a domain for which a message is to be generated when said delivery message extractor instructs a message to be generated, checks if a message has already been generated for the domain for which a message is to be generated when said delivery message extractor instructs said first message generation instructing function to generate a message, checks if a message has already been generated for the node for which a message is to be generated when said delivery message extractor instructs said second message generation instructing function to generate a message, and instructs said first message generation instructing function or said second message generation instructing function to generate a message if no message has already been generated for the domain or node for which a message is to be generated.

16. An advertisement search agent system according to claim 15, wherein said message database stores messages generated by instructions to generate a message from a plurality of said delivery message extractors.

17. An advertisement search agent system according to claim 13, wherein when said message delivery unit is configured to deliver a message according to said node delivery function, said message delivery unit converts the message into a unicast message and delivers the unicast message.

* * * * *